William D. Titus' Impts in Ploughs
72568
PATENTED DEC 24 1867
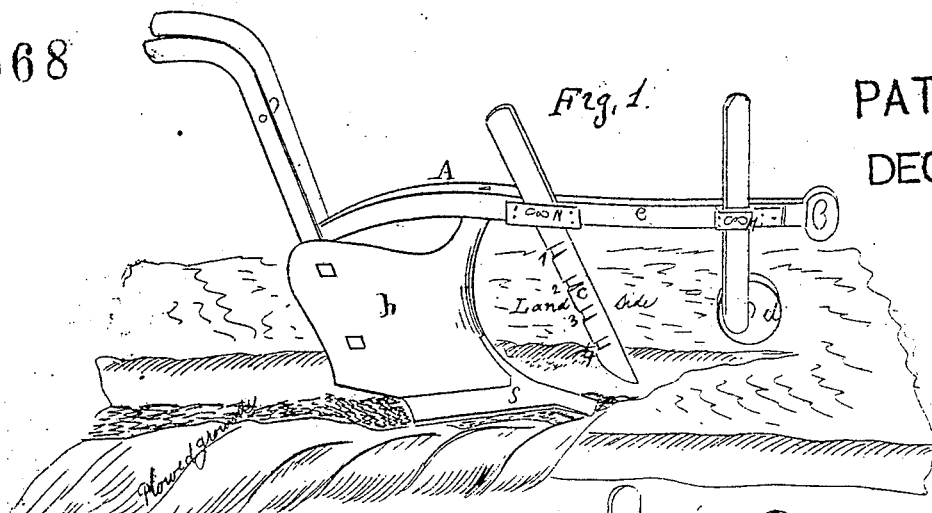
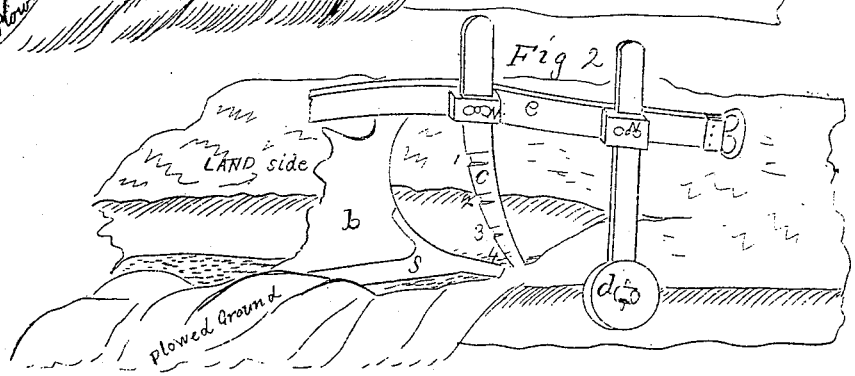
Witnesses.
James P. McLean
Anne A. McLean
Wm D Titus
Inventor

United States Patent Office.

WILLIAM D. TITUS, OF BROOKLYN, NEW YORK.

Letters Patent No. 72,568, dated December 24, 1867.

IMPROVEMENT IN PLOUGHS.

*The Schedule referred to in these Letters Patent and making part of the same.*

TO ALL WHOM IT MAY CONCERN:

Be it known that I, WILLIAM D. TITUS, of the city of Brooklyn, in the county of Kings, and State of New York, have invented certain novel and useful Improvements in Ploughs; and I hereby declare the following to be a full, clear, and exact description thereof, reference being had to the accompanying drawings, which are lettered to correspond with and form a part of the specification.

To enable the public to understand the nature of my invention, and those skilled in the manufacture and use of ploughs to construct and use the same, I will describe it as follows, to wit:

Figure 1, letter A, is a perspective side view of a plough, showing the mould-board $b$, coulter $c$, gauge-wheel $d$.

Figure 2 is a perspective side view of a section of the beam $e$, with gauge-wheel $d$ reversed.

The nature of my invention consists in constructing the malleable-iron mould-board $b$ and share $s$ in one piece, the point and cutting-edges of the share $s$ being laid with steel, which is firmly welded into the malleable iron. The adjustable coulter is provided with a set-screw, N, and a number of transverse grooves, 1, 2, 3, 4, which are cut at right angles to the cutting-edge of the coulter $c$ for the purpose of assisting in holding the plough in the ground, and thus prevent the necessity of bearing upon the beam $e$, as is frequently the case in hard soils. The gauge-wheel $d$ and coulter $c$ are adjustable by means of set-screws N N, so that they may be raised or lowered to any required depth. When it becomes necessary to plough beam-deep, (for instance, crop-ploughing,) the wheel $d$ is changed so that it runs in the furrow and off the land, as shown at fig. 2.

The advantages of the above improvements over the ploughs that are in common use is, first, by casting the mould-board and share in one piece of malleable iron, with tempered edges, I prevent the loosening of the share, and the many annoyances from the shares not fitting, &c.; second, by corrugating or grooving the adjustable coulter $c$, I am enabled to keep the plough in the ground with less labor to the holder and team, and by means of the adjustable gauge-wheel $d$, I retain any desired depth of furrow.

Therefore, what I claim as novel and useful, and what I wish to secure by Letters Patent of the United States, is—

1. The malleable-iron mould-board $b$ and share S in one piece.
2. I also claim the grooves 1, 2, 3, 4, in the adjustable coulter $c$ and the adjustable gauge-wheel $d$, substantially as described and for the purpose set forth.

In testimony whereof, I hereunto subscribe my name in the presence of two witnesses.

WM. D. TITUS.

Witnesses:
 JAMES P. McLEAN,
 WM. FARHER.